(12) United States Patent
Lalley

(10) Patent No.: US 7,047,039 B2
(45) Date of Patent: May 16, 2006

(54) SYSTEM FOR STREAMING BROADCAST SIGNALS FROM AUTOMOBILES

(75) Inventor: Timothy J. Lalley, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 10/237,075

(22) Filed: Sep. 9, 2002

(65) Prior Publication Data
US 2004/0204052 A1 Oct. 14, 2004

(51) Int. Cl.
*H04M 1/00* (2006.01)

(52) U.S. Cl. .............. 455/556.2; 455/418; 455/445; 370/254; 370/331; 701/208; 705/26; 725/81; 345/156; 709/219

(58) Field of Classification Search .......... 455/556.1, 455/556.2, 418; 370/254, 331; 701/208; 385/135; 345/173, 156; 705/26; 361/683; 704/275; 709/219; 725/81, 246
See application file for complete search history.

(56) References Cited

U.S. PATENT DOCUMENTS

| 5,572,442 | A | * | 11/1996 | Schulhof et al. ............ 709/219 |
| 5,859,628 | A | * | 1/1999 | Ross et al. ................. 345/173 |
| 6,236,796 | B1 | * | 5/2001 | Tamura et al. .............. 385/135 |
| 6,266,539 | B1 | * | 7/2001 | Pardo ....................... 455/556.2 |
| 6,278,862 | B1 | | 8/2001 | Henderson |
| 6,496,692 | B1 | * | 12/2002 | Shanahan ................... 455/418 |
| 6,516,268 | B1 | * | 2/2003 | Ruiz et al. .................. 701/208 |
| 6,539,358 | B1 | * | 3/2003 | Coon et al. ................. 704/275 |
| 6,647,001 | B1 | * | 11/2003 | Bhagavath et al. ......... 370/331 |
| 6,754,183 | B1 | * | 6/2004 | Razavi et al. .............. 370/254 |
| 6,788,528 | B1 | * | 9/2004 | Enners et al. .............. 361/683 |
| 6,826,405 | B1 | * | 11/2004 | Doviak et al. .............. 455/445 |
| 2002/0049640 | A1 | * | 4/2002 | Sheriff et al. ................ 705/26 |
| 2002/0130834 | A1 | * | 9/2002 | Madarasz et al. .......... 345/156 |

* cited by examiner

Primary Examiner—William Trost
Assistant Examiner—Chuck Huynh

(57) ABSTRACT

A system for streaming broadcast audio and/or video signals from an automobile uses a personal digital assistant (PDA) device and a PDA docking station to transmit the audio and/or video signals to the automobile's existing stereo system and/or video monitor. As a result, a user can log on to any radio or television station that streams audio and/or video broadcast over the Internet, and listen to and/or watch the live broadcast in the automobile. The system utilizes current technology and communication infrastructure to bring the Internet and all of its services to the automobile. In addition to providing a wide variety of music, news and sports for drivers, the system provides a global listening audience for companies that wish to advertise to a broad spectrum of people.

17 Claims, 2 Drawing Sheets

SYSTEM FOR STREAMING BROADCAST SIGNALS FROM AUTOMOBILES

TECHNICAL FIELD

The technical field relates to network signal streaming systems, and, in particular, to systems for streaming broadcast signals from automobiles.

BACKGROUND

The broadcasting industry uses networks to reach larger audiences by streaming audio and/or video signals over the Internet. Audiences can use network connections to stream radio or television broadcast signals from offices, homes, or any place with a network connection.

However, due to hardware limitations, audio and/or video streaming is not currently available in automobiles. Therefore, a user can only listen to local radio stations broadcast while traveling in an automobile. As cities become bigger and driving time become longer, people are spending more and more time in the automobiles. Being able to stream broadcast signals from the automobiles becomes increasing important.

Currently, some network companies stream music broadcast through satellite technology. However, these companies require special hardware to replace current radio systems and require users to sign up for expensive subscription services.

SUMMARY

A system for streaming broadcast signals from automobiles includes a personal digital assistant (PDA) connection system for an automobile and a connection to a network. The automobile includes a stereo system. The PDA connection system includes a PDA device with wireless communication capability. The PDA connection system also includes a PDA docking station for the PDA device. The PDA docking system is operably connected to the stereo system, and provides operating power for the PDA device. The connection links the PDA device to the network. The PDA connection system may receive broadcast signals streamed through a network and transmit the broadcast signals to the stereo system.

The PDA docking station may be connected to the stereo system through a hardwired connection, or through a wireless connection. Speed and volume control of the broadcast signals may be performed through the PDA device or through the stereo system.

The system may also include a power supply for supplying operating power to the PDA docking station. The PDA docking station may be connected to the power supply through a hardwired connection to a battery of the automobile, or through a power adapter connected to a cigarette lighter.

The broadcast signals may be audio signals or combined audio and video signals. The system may also include a video monitor that receives the broadcast signals from the PDA connection system.

DESCRIPTION OF THE DRAWINGS

The preferred embodiments of the method and apparatus for streaming broadcast signals from automobiles will be described in detail with reference to the following figures, in which like numerals refer to like elements, and wherein.

DETAILED DESCRIPTION

A system for streaming broadcast audio and/or video signals from an automobile uses a personal digital assistant (PDA) device and a PDA docking station to transmit the audio and/or video signals to the automobile's stereo system and/or video monitor. The PDA device is a portable electronic device that provides various productivity applications in a convenient hand held form. The PDA device typically has wireless Internet capability and can receive broadcast signals streamed over the Internet using radio frequency (RF) or cellular technology. Examples of the PDA device include products generated from RF and cellular communications technologies or Bluetooth®, which is a brand name technology that uses specific hardware and RF protocols to connect several hardware devices over a wireless network.

The PDA device may be placed in the PDA docking station for use in the automobile. The PDA docking station typically charges the PDA device using either a hardwired connection to the automobile's battery or a power adapter connected to the automobile's cigarette lighter. The PDA docking station is typically operably connected to and integrated into an existing stereo system and/or video monitor of the automobile. When placed in the PDA docking station, the PDA device receives broadcast signals streamed over the network, and transmits the signals to the stereo system and/or the video monitor. The PDA docking station may be mounted on a dashboard of the automobile, or any other place in the automobile that provides convenient user access. The installation of the PDA docking station may be similar to the installation of a cellular telephone docking station. As a result, using the PDA device and the existing stereo system and/or video monitor, a user can log on to any radio or television station that streams audio and/or video broadcast over the Internet, and listen to and/or watch the live broadcast while driving in the automobile.

Currently, more than 500,000 hours per week of live programming are broadcast across the Internet from all over the world. Such programs include Internet-based radio shows, sports events, or special conference proceedings. The system for streaming broadcast audio and/or video signals from an automobile utilizes current technology and communication infrastructure to bring the Internet and Internet related services to the automobile. In addition to providing a wide variety of music, news and sports for drivers, the system provides a global listening audience for companies that wish to advertise to a broad spectrum of people.

Figure 1:
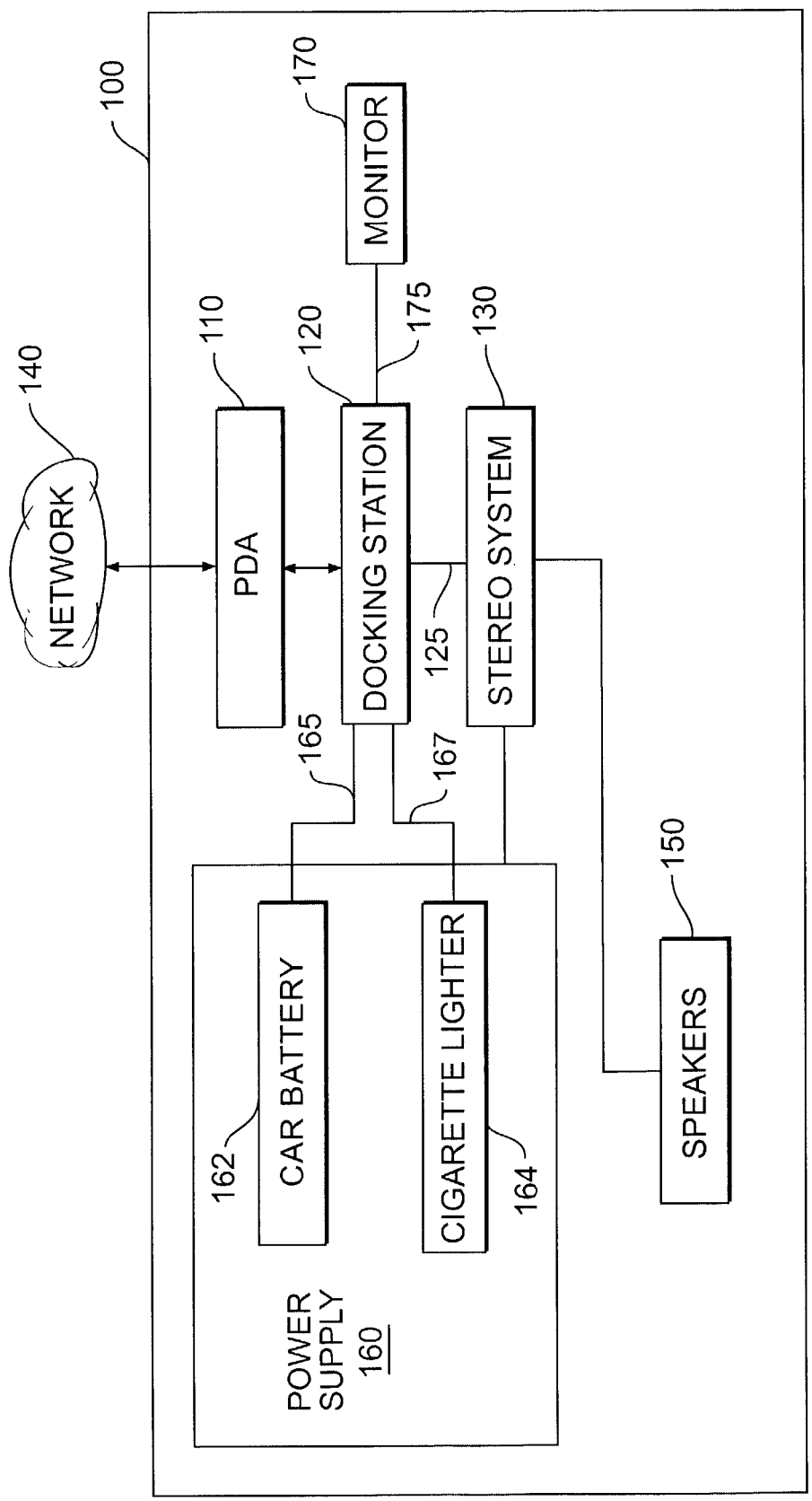
FIG. 1 illustrates an exemplary personal digital assistant (PDA) connection system that streams audio and/or video signals from an automobile through a network.

FIG. 1 illustrates an exemplary PDA connection system 100 that streams audio/video signals from an automobile through a network 140. The PDA connection system 100 includes a handheld PDA device 110 and a PDA docking station 120. The PDA device 110 includes a wireless connection with the network 140, such as the Internet or other type of computer or telephone networks. The PDA device 110 is capable of receiving broadcast audio and/or video signals steamed over the network 140. The PDA device 110 may be placed in the PDA docking station 120, which is typically integrated into the automobile's existing stereo system 130. The PDA docking station 120 may be connected to the stereo system 130 using a hardwired connection or wireless radio frequency connection 125. One skilled in the art will appreciate that other types of connection may be used to connect the PDA docking station 120 to the stereo system 130.

The PDA connection system 100 may also include a video monitor 170 operably connected to the PDA docking station 120 for video streaming. Because of the large amount of data involved, higher processing speed is needed from the PDA device 110 for video transmission than for audio transmission. A similar hardwired connection or wireless radio frequency connection 175 may be used to transmit video signals from the PDA docking station 130 to the video monitor 170. Audio signals may also be transmitted to the video monitor 170 if the video monitor 170 has audio capability, for example, with built-in speakers. Alternatively, audio signals are transmitted to the stereo system 130 and played back using the automobile's built-in speakers 150 that are connected to the stereo system 130. As a result, the PDA device 110 and the PDA docking station 120 transmit audio and/or video signals streamed over the network 140 to the existing stereo system 130 and/or the video monitor 170 of the automobile, so that a user may enjoy wide variety of music, news and sports while traveling in the automobile.

The most important video codec standards for streaming video are H.261, H.263, motion picture experts group (MPEG), MPEG1, MPEG2 and MPEG4. H.261 is video coding standard published by the ITU (International Telecommunication Union) for dataraters that are multiples of 64 Kbit/s. H.263 is a provisional ITU standard for low bitrate communication. Compared to video codecs for CD-ROM or TV broadcast, which are compression algorithms for storing and transmitting motion video over the Internet, codecs designed for the Internet require greater scalability, lower computational complexity, greater resiliency to network losses, and lower encode/decode latency for video conferencing. In addition, the codecs are tightly linked to network delivery software to achieve the highest possible frame rates and picture quality.

The PDA connection system 100 may also include a power supply 160, which supplies operating power to the docking station 120, the stereo system 130, the video monitor 170, and other systems in the automobile. The PDA docking station 120 may be connected to the power supply 160 through a hardwired power connection 165 to the automobile's battery 162. Alternatively, a cigarette lighter 164 may be used to supply operating power to the PDA docking station 120 through a power adopter 167.

Figure 2:
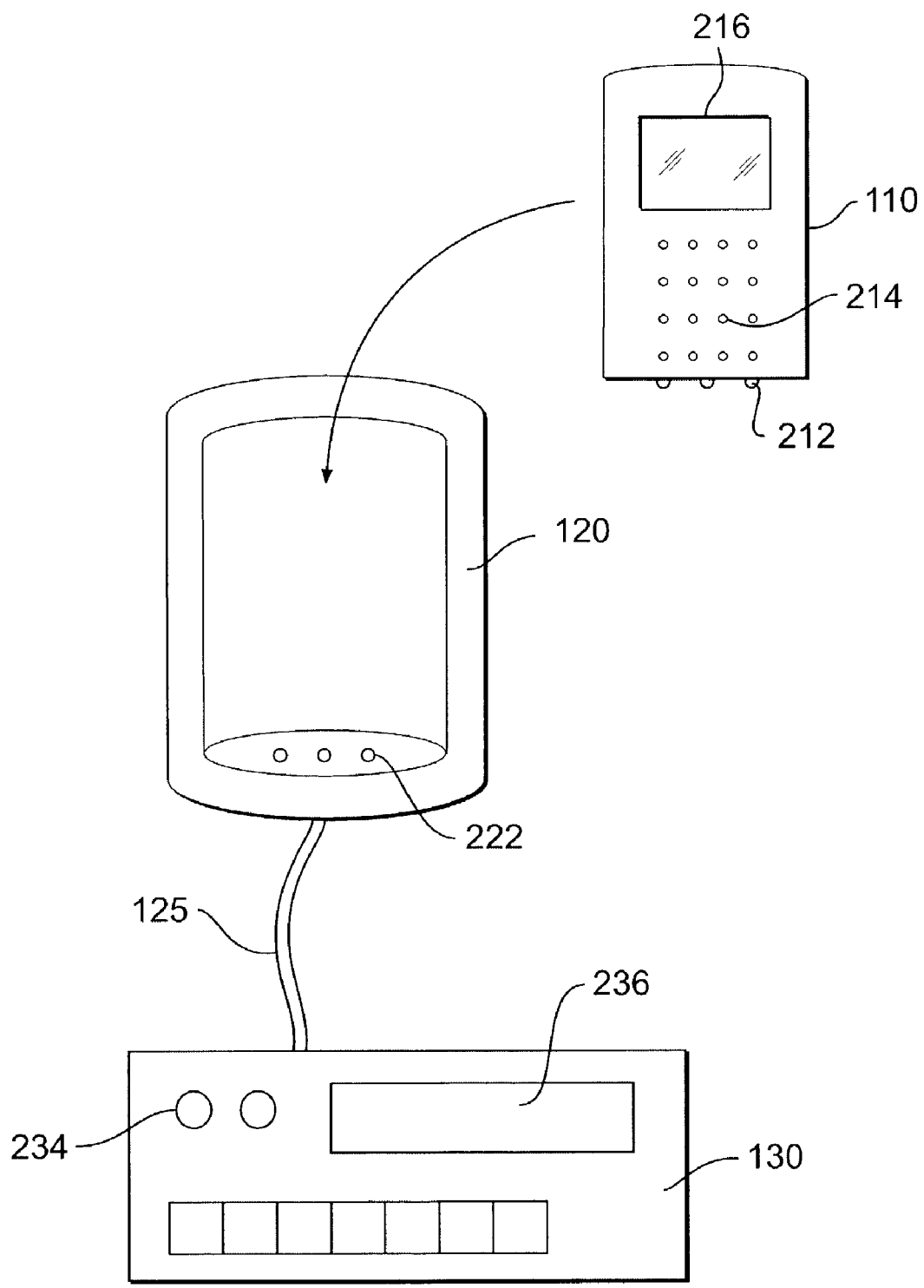
FIG. 2 illustrates in detail exemplary components of the PDA connection system of FIG. 1.

FIG. 2 illustrates in detail the PDA device 110, the PDA docking station 120, and the stereo system 130 of the PDA connection system 100 of FIG. 1. The PDA device 110 typically includes a display 216, control keys 214, and electric signal connectors 212. The control keys 214 may be used to select web sites for audio and/or video streaming. The user may also use the control keys 214 to adjust speed, volume and other audio and/or video control or the broadcast. Examples of the control keys 214 include start, stop, pause, or volume control. When the PDA device 110 is placed in the PDA docking station 120, the electric signal connectors 212 of the PDA device 110 contact electric signal connectors 222 of the PDA docking station 120 for the transmission of the audio and/or video signals.

As shown in FIG. 2, the PDA docking station 120 is internally connected to the stereo system 130 through the hardwired connection or wireless connection 125. The stereo system 130 also includes a display 236 and control keys 234. The user may alternatively use the control keys 234 of the stereo system 130 for volume or other audio adjustment.

One skilled in the art will appreciate that other types of audio control may be used in connection with the PDA connection system 100.

Once the PDA device 110 is placed in the PDA docking station 120, the user can log on to a particular web site that streams broadcast over the Internet, by typing in the station's uniform resource locator (URL) using the PDA device 110. Thereafter, the user can listen to the streaming audio signals using the existing stereo system 130 in the automobile. The PDA connection system 100 also enables the user to download MP2 or music files from the Internet while in the automobile, thus bringing many Internet services and entertainment to the automobile. One skilled in the art will appreciate that other types of Internet services may be supplied using the PDA connection system 100.

While the method and apparatus for streaming broadcast signals from automobiles have been described in connection with an exemplary embodiment, those skilled in the art will understand that many modifications in light of these teachings are possible, and this application is intended to cover any variations thereof.

What is claimed is:

1. A system for streaming broadcast signals from automobiles, comprising:
    a personal digital assistant (PDA) connection system for an automobile, wherein the automobile includes a stereo system, and wherein the PDA connection system comprises:
    a PDA device with wireless communication capability;
    a PDA docking station for the PDA device, wherein the PDA docking station is operably connected to the stereo system, and wherein the PDA docking station provides operating power for the
    PDA device; and
    a connection that links the PDA device to a network, wherein the PDA connection system receives broadcast signals streamed over the network and transmits the broadcast signals to the stereo system; wherein the PDA device enables speed and volume control of the broadcast signals.

2. The system of claim 1, further comprising a power supply operably connected to the PDA docking station, wherein the power supply supplies operating power to the PDA docking station.

3. The system of claim 2, wherein the PDA docking station is connected to the power supply through a hardwired connection to a battery of the automobile.

4. The system of claim 2, wherein the PDA docking station is connected to the power supply through a power adapter.

5. The system of claim 1, wherein the broadcast signals are audio signals.

6. The system of claim 1, wherein the broadcast signals are combined audio and video signals.

7. The system of claim 6, further comprising a video monitor, wherein the PDA connection system transmits the broadcast signals to the video monitor.

8. The system of claim 1, wherein the PDA docking station is connected to the stereo system through a hardwired connection.

9. The system of claim 1, wherein the PDA docking station is connected to the stereo system through a wireless connection.

10. The system of claim 1, further comprising speakers operably connected to the stereo system.

11. A system for streaming broadcast signals from automobiles, comprising:

a personal digital assistant (PDA) connection system for an automobile, wherein the automobile includes a stereo system, and wherein the PDA connection system comprises:
  a PDA device with wireless communication capability;
  a PDA docking station for the PDA device, wherein the PDA docking station is operably connected to the stereo system, and wherein the PDA docking station provides operating power for the PDA device; and
  a connection that links the PDA device to a network, wherein the PDA connection system receives broadcast signals streamed over the network and transmits the broadcast signals to the stereo system; wherein the stereo system enables speed and volume control of the broadcast signals.

12. A system for streaming broadcast signals from automobiles, comprising:
  a personal digital assistant (PDA) connection system for an automobile, wherein the automobile includes a video monitor, and wherein the PDA connection system comprises:
    a PDA device with wireless communication capability;
    a PDA docking station for the PDA device, wherein the PDA docking station is operably connected to the video monitor, and wherein the PDA docking station provides operating power for the PDA device;
    a power supply operably connected to the PDA docking station, wherein the power supply supplies operating power to the PDA docking station; and
    a connection that links the PDA device to a network, wherein the PDA connection system receives signal streamed over the network and transmits the broadcast signals to the video monitor; wherein the PDA device enables speed and volume control of the broadcast signals.

13. The system of claim 12, wherein the PDA docking station is connected to the power supply through a hardwired connection to a battery of the automobile.

14. The system of claim 12, wherein the PDA docking station is connected to the power supply through a power adapter.

15. The system of claim 12, wherein the PDA docking station is connected to the stereo system through a hardwired connection.

16. The system of claim 12, wherein the PDA docking station is connected to the stereo system through a wireless connection.

17. The system of claim 12, wherein the video monitor enables speed and volume control of the broadcast signals.

* * * * *